United States Patent [19]

Bailey et al.

[11] Patent Number: 4,981,154
[45] Date of Patent: Jan. 1, 1991

[54] FLUID FLOW CONTROL DEVICE

[75] Inventors: David F. Bailey, Riverview; William H. Morrison, Jr., Valrico, both of Fla.

[73] Assignee: Hollister, Inc., Libertyville, Ill.

[21] Appl. No.: 472,366

[22] Filed: Jan. 30, 1990

[51] Int. Cl.⁵ ............................................. F16K 31/22
[52] U.S. Cl. .................................... 137/202; 137/569; 137/199
[58] Field of Search ........................ 137/202, 199, 569

[56] References Cited

U.S. PATENT DOCUMENTS

| | | | |
|---|---|---|---|
| 1,993,267 | 3/1935 | Ferguson | 417/199.2 X |
| 3,285,270 | 11/1966 | Klinefelter | 137/202 |
| 3,323,465 | 6/1967 | Stillebroer | 415/204 |
| 3,601,140 | 8/1971 | Hooper | 137/199 X |
| 3,644,061 | 2/1972 | McFarlin | 417/203 |
| 4,019,680 | 4/1977 | Norris | 417/199.2 X |
| 4,104,004 | 8/1978 | Graef | 137/202 X |
| 4,459,468 | 7/1984 | Bailey | 219/212 |
| 4,614,480 | 9/1986 | Hardison | 417/199.2 |

*Primary Examiner*—Alan Cohan
*Attorney, Agent, or Firm*—A. W. Fisher, III

[57] ABSTRACT

A fluid flow control device operable in a gas purge mode, liquid flow mode or backflow restriction mode for use with a fluid circulating system to selectively control the direction of fluid flow through the fluid circulating system, the fluid flow control device comprises a valve body including a lower fluid chamber and an upper float chamber formed therein and a spherical float movable disposed within the upper float chamber to control the direction of fluid flow through the fluid flow control device, the valve body includes a gas outlet, a fluid outlet, a liquid outlet and a fluid inlet such that fluid entering the upper float chamber controls the position of the spherical float therein to cause gas to flow through the gas outlet and liquid to flow through the liquid outlet and prevent backflow of gas or liquid through the fluid outlet.

14 Claims, 2 Drawing Sheets

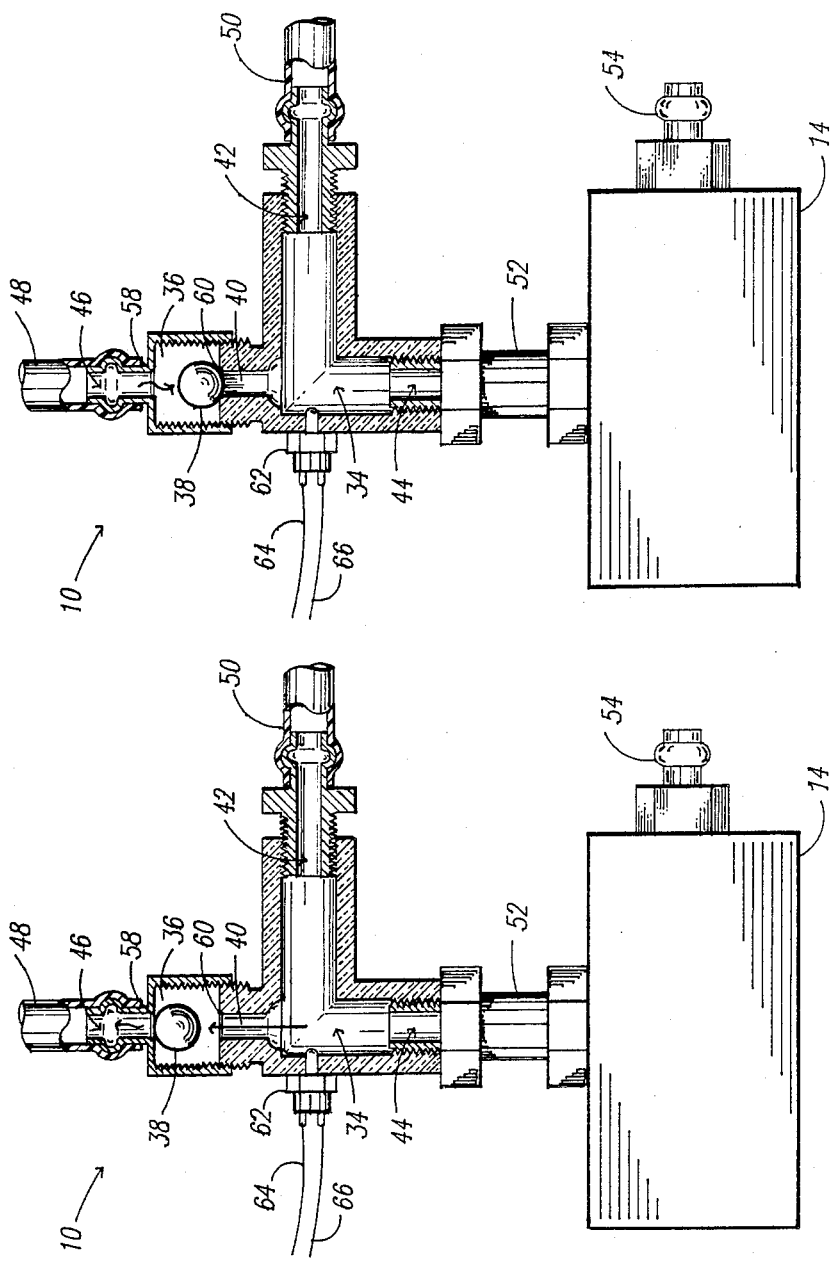

FLUID FLOW CONTROL DEVICE

BACKGROUND OF THE INVENTION

1. Field Of The Invention

A fluid flow control device for use with a fluid circulating system to selectively control the direction of fluid flow through the fluid circulating system.

2. Description of The Prior Art

Most fluid pump systems include valve means to control the direction of fluid therethrough.

U.S. Pat. No. 4,019,680 discloses a steam boiler system including an automatic means for injecting cool water into a steam bound boiler feed pump. A first embodiment includes a pressure sensitive check valve to detect a drop of pressure in the steam bound pump and direct a cool water mist into the high side of the pump to reinitiate the operation of the pump. A second embodiment includes spraying cool water into the pump in response to a drop of the water level in the boiler. Both embodiments include a vent line to bleed the high side of the centrifugal pump to a condensate tank in response to a drop of pressure in the pump. The vent line may be bled through a check valve or directly through a manual valve. Each embodiment uses a pressure sensitive valve in the boiler feed line to stop the pump flow to the boiler whenever the pressure in the boiler exceeds the pressure at the output of the pump.

U.S. Pat. No. 1,993,267 shows a pump apparatus comprising a pipe including an enlarged area having a valve seat formed therein to selectively receive a ball valve held from accidental displacement by cross-rods or other suitable retaining means. The ball valve has a specific gravity such that at a predetermined water level in the reservoir the ball valve will remain unseated against the circulation caused by the suction at the discharge end. However, when the pump and reservoir are entirely filled with water and the ball valve is subjected to an upward pressure of the water in addition to the suction at the orifice of the nozzle, the ball valve will rise and seat to prevent re-circulation of the priming water in the reservoir.

U.S. Pat. No. 4,614,480 teaches a pump system including a ball check valve located downstream from a pump.

U.S. Pat. No. 3,644,061 discloses a pump apparatus including a one-way check valve in a discharge pipe to prevent air from returning to the pump.

An additional example of the prior art is found in U.S. Pat. No. 3,323,465.

SUMMARY OF THE INVENTION

The present invention relates to a fluid flow control device operable in a gas purge mode, liquid flow mode or backflow restriction mode for use with a fluid circulating system similar to the temperature control fluid circulating system disclosed in U.S. Pat. No. 4,459,468. More specifically, the fluid circulating system comprises a fluid reservoir coupled to a magnetically coupled centrifugal pump and a thermal blanket to selectively circulate liquid to and from the thermal blanket.

The fluid flow control device comprises a valve body including a lower fluid chamber and an upper float chamber formed therein and a float movably disposed within the upper float chamber to control the direction of fluid flow through the fluid flow control device. The fluid flow control device further includes a gas outlet, liquid outlet, fluid outlet and fluid inlet. The gas outlet, liquid outlet and fluid inlet are coupled to the fluid reservoir, thermal blanket and magnetically coupled centrifugal pump respectively by fluid conduits. A gas outlet seat and a fluid backflow seat are formed adjacent the gas outlet and fluid outlet respectively to selectively receive the float to prevent flow therethrough when the fluid flow control device is operating in the liquid flow mode and backflow restriction mode respectively as described more fully hereinafter.

When the magnetically coupled centrifugal pump is initially started, the gas therein unseats the float from the fluid backflow seat permitting gas to flow through the gas outlet to the fluid reservoir. As the pressure within the magnetically coupled centrifugal pump increases to operating pressure the liquid within the upper float chamber forces the float upward to seat against the gas outlet seat directing the liquid through the liquid outlet to the thermal blanket. When the magnetically coupled centrifugal pump is stopped, the float will fall within the upper float chamber to seat against the fluid outlet seat to prevent backflow of liquid from the fluid reservoir to the lower fluid chamber.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2 is a detailed side view of the fluid flow control device in the liquid flow mode.

FIG. 3 is a detailed side view of the fluid flow control device in the backflow restriction mode.

Similar reference characters refer to similar parts throughout the several views of the drawings.

DETAILED DESCRIPTION OF THE PREFERRED EMBODIMENT

Figure 1:
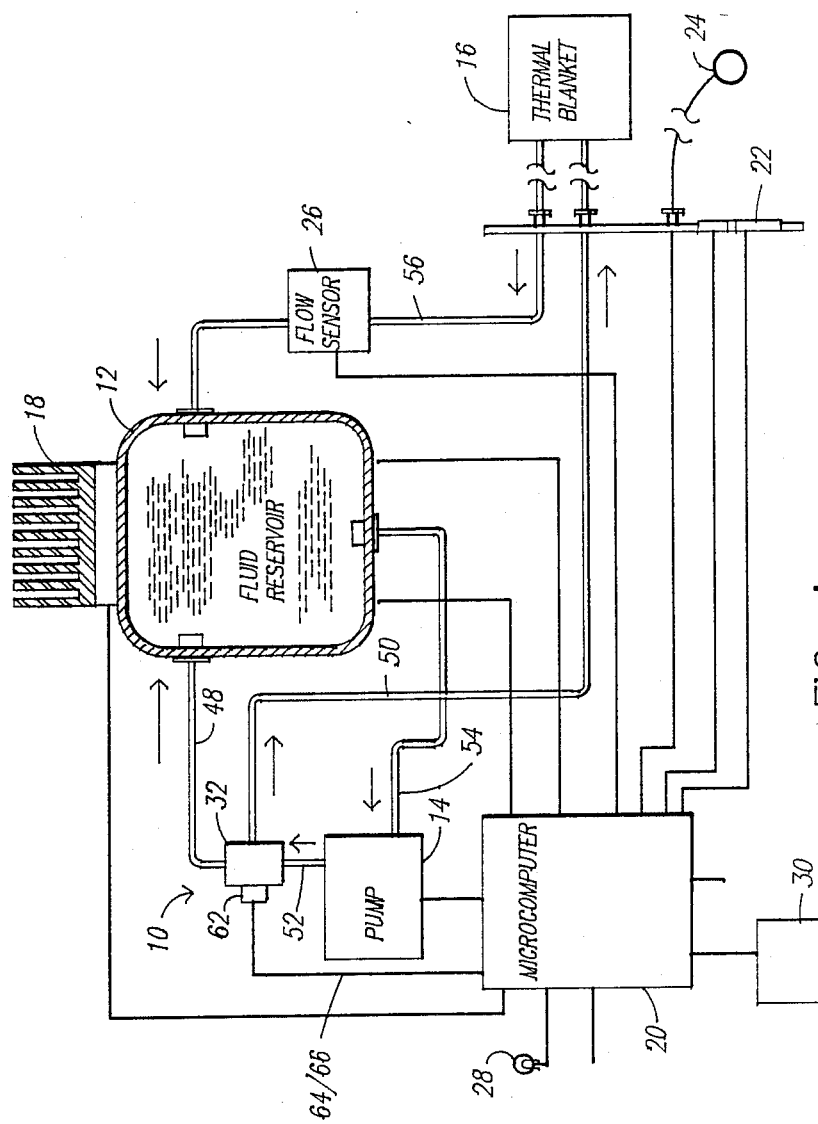
FIG. 1 is a schematic view of a fluid circulating system including the fluid flow control device of the present invention.

The present invention relates to a fluid flow control device generally indicated as 10 operable in a gas purge mode, liquid flow mode or backflow restriction mode for use with a fluid circulating system similar to the temperature control fluid circulating system disclosed in U.S. Pat. No. 4,459,468.

More specifically, the fluid circulating system comprises a fluid reservoir 12 coupled to a magnetically coupled centrifugal pump 14 and a thermal blanket 16 to selectively circulate fluid to and from the thermal blanket 16 or similar remote liquid circulating manifold. The operation of one or more thermal modules 18, disposed in thermal transfer relationship with the fluid reservoir 12, is controlled by a microcomputer 20 and display/control module 22. The fluid circulating system further includes a remote temperature sensor 24, fluid flow sensor 26, system warning indicator 28 and power supply 30

As shown in FIGS. 1 through 3, the fluid flow control device 10 comprises a valve body 32 including a lower fluid chamber 34 and an upper float chamber 36 formed therein and a spherical float 38 movably disposed within the upper float chamber 36 to control the direction of fluid flow through the fluid flow control device 10. The lower fluid chamber 34 includes a fluid outlet, liquid outlet and fluid inlet indicated as 40, 42 and 44 respectively; while the upper float chamber 36 includes a gas outlet 46.

The gas outlet 46 is coupled to the upper portion of the fluid reservoir 12 by a first fluid conduit 48; while the liquid outlet 42 is coupled to the inlet side of the thermal blanket 16 by a second fluid conduit 50. The fluid inlet 44 is coupled to the outlet side of the magnetically coupled centrifugal pump 14 by a third conduit 52. The inlet side of the magnetically coupled centrifugal pump 14 is, in turn, coupled to the lower portion of the fluid reservoir 12 by a third fluid conduit 54. The outlet side of the thermal blanket 16 is coupled to the upper portion of the fluid reservoir 12 through the fluid flow sensor 26 and a fifth conduit 56.

A gas outlet seat 58 and a fluid backflow seat 60 are formed adjacent the gas outlet 46 and fluid outlet 40 respectively to selectively receive the spherical float 36 to prevent flow respectively therethrough when the fluid flow control device 10 is operating in the liquid flow mode or backflow restriction mode respectively as described more fully hereinafter.

A thermostat 62, coupled to the microcomputer 20 by conductors 64 and 66, is disposed in the lower fluid chamber 34 to monitor the temperature of liquid from the magnetically coupled centrifugal pump 14.

The density of the spherical float 38 is such that the spherical float 38 will not float in the liquid or gas and that the weight of the spherical float 38 less the weight of the displaced liquid within the float chamber 36 does not exceed the pressure applied to dislodge the spherical float 38 from the fluid backflow seat 60.

The distance between the gas outlet seat 58 and the fluid backflow seat 60 is greater than the diameter of the spherical float 38; while, the cross-sectional diameter of the float chamber 36 is less than five times the diameter of the spherical float 38.

When the magnetically coupled centrifugal pump 14 is initially started, the gas therein unseats the spherical float 38 from the fluid backflow seat 60 permitting gas to flow through the gas outlet 46 and first fluid conduit 48 to the upper portion of the fluid reservoir 12. As the pressure within the magnetically coupled centrifugal pump 14 increases to operating pressure, the liquid within the upper float chamber 36 forces the spherical float 38 upward to seat against the gas outlet seat 58 directing liquid from the magnetically coupled centrifugal pump 14 through the liquid outlet 42 and second fluid conduit 50 to the thermal blanket 16. When the magnetically coupled centrifugal pump is stopped, the spherical float 38 will fall within the upper float chamber 36 to seat against the backflow seat 60 to prevent backflow of liquid from the upper portion of the fluid reservoir 12 through the first fluid conduit 48 and upper float chamber 36 to lower fluid chamber 34 isolating the thermostat 62 from liquid that may flow from the upper portion of the fluid reservoir 12 due to thermal convection.

Thus, the fluid flow control device 10 allows gas to pass around the spherical float 38 disposed in the upper float chamber 36 when the magnetically coupled centrifugal pump 14 is not up to operating pressure and when the magnetically coupled centrifugal pump 14 is up to operating pressure the liquid forces the spherical float 38 against the gas outlet 58 preventing flow of fluid to the fluid reservoir 12 and directing liquid to the thermal blanket 16 through the liquid outlet 42 and second fluid conduit 50. The fluid flow control device 10 also prevents fluid from circulating in the reverse direction from the upper portion of the fluid reservoir 12 through the fluid outlet 40 isolating the thermostat 62 from the liquid in the fluid reservoir 12 to preclude false temperature readings.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fluid flow control device operable in a gas purge mode, liquid flow mode or backflow restriction mode for use with a fluid circulating system to selectively control the direction of fluid flow through the fluid circulating system, said fluid flow control device comprises a valve body including a lower fluid chamber and an upper float chamber formed therein and a float movable disposed within said upper float chamber to control the direction of fluid flow through said fluid flow control device, said valve body includes a gas outlet formed in the upper portion of said upper float chamber, a fluid outlet formed in the upper portion of said lower fluid chamber in fluid communication with said upper float chamber, a liquid outlet and a fluid inlet formed in the lower portion of said lower fluid chamber such that fluid entering the upper float chamber controls the position of said float therein to cause gas to flow through said gas outlet when in said gas purge mode and liquid to flow through said liquid outlet when in said liquid flow mode and prevent backflow of gas or liquid through said fluid outlet when in said backflow restriction mode, a gas outlet seat and a fluid backflow seat formed adjacent said gas outlet and said fluid outlet respectively to selectively receive said float to prevent flow respectively therethrough when said fluid flow control device is in said liquid flow mode and said backflow restriction mode respectively and a thermostat disposed in said lower fluid chamber to monitor the temperature of liquid received through said fluid inlet, said thermostat being isolated from said upper float chamber by said float seated on said gas outlet seat when said fluid flow control device is in backflow restriction mode.

2. The fluid flow control device of claim 1 wherein the density of said float is such that said float will not float in liquid or gas within said upper float chamber.

3. The fluid flow control device of claim 2 wherein the weight of said float less the weight of displaced liquid within said chamber does not exceed the force to do pressure applied to dislodge said float from said fluid backflow seat.

4. A fluid flow control device operable in a gas purge mode, liquid flow mode or backflow restriction mode for use with a fluid circulating system including a pump to selectively control the direction of fluid flow through the fluid circulating system, said fluid flow control device comprises a valve body including a lower fluid chamber and an upper float chamber formed therein and a float movable disposed within said upper float chamber to control the direction of fluid flow through said fluid flow control device, said valve body includes a gas outlet, a fluid outlet, a liquid outlet and a fluid inlet operatively coupled to the outlet of the pump such that fluid entering the upper float chamber when the pump is operating, controls the position of said float therein to cause gas to flow through said gas outlet when in said gas purge mode and liquid to flow through said fluid outlet when in said liquid flow mode and when the pump is not operating, prevent backflow of gas or liquid through said fluid outlet when in said backflow restriction mode and a gas outlet seat and a fluid backflow seat formed adjacent said gas outlet and said fluid outlet respectively to selectively receive said float to prevent flow respectively therethrough when said fluid flow control device is in said liquid flow mode and said backflow restriction mode respectively whereby gas is purged from the pump.

5. The fluid control device of claim 4 wherein said gas outlet is formed in the upper portion of said upper float chamber, said fluid outlet is formed in the upper portion of said flower fluid chamber in fluid communication with said upper float chamber and said lower fluid chamber.

6. The fluid control device of claim 4 further including a thermostat disposed in said lower fluid chamber to monitor the temperature of liquid received through said fluid inlet said thermostat being isolated from said upper float chamber by said float seated on said gas outlet seat when said fluid flow control device is in said backflow restriction mode.

7. The fluid control device of claim 4 wherein the density of said float is such that said float will not float in liquid or gas within said upper float chamber.

8. The fluid control device of claim 7 wherein the weight of said float less the weight of displaced liquid within said chamber does not exceed the force due to pressure applied to dislodge said float from said fluid backflow seat.

9. A fluid flow control device operable in a gas purge mode, liquid flow mode or backflow restriction mode for use with a fluid circulating system including a pump coupled to the output of a fluid reservoir to selectively control the direction of fluid flow through the fluid circulating system, said fluid flow control device comprises a valve body including a lower fluid chamber coupled to the output of the pump and an upper float chamber coupled to the fluid reservoir formed therein and a float movable disposed within said upper float chamber to control the direction of fluid flow through said fluid flow control device, said valve body includes a gas outlet, a fluid outlet, a liquid outlet and a fluid inlet such that fluid entering the upper float chamber when the pump is operating controls the position of said float therein to cause gas to flow through said gas outlet to the fluid reservoir when in said gas purge mode and liquid from the fluid reservoir to flow through said liquid outlet when in said liquid flow mode and when the pump is not operating to prevent backflow of gas or liquid from the fluid reservoir through said fluid outlet when in said backflow restriction mode.

10. The fluid flow control device of claim 9 wherein said gas outlet is formed in the upper portion of said upper float chamber, said fluid outlet is formed in the upper portion of said lower fluid chamber in fluid communication with said upper float chamber and said fluid inlet is formed in the lower portion of said lower fluid chamber.

11. The fluid flow control device of claim 10 further including a gas outlet seat and a fluid backflow seat formed adjacent said gas outlet and said fluid outlet respectively to selectively receive said float to prevent flow respectively therethrough when said fluid flow control deice is in said liquid flow mode and said backflow restriction mode respectively.

12. The fluid flow control device of claim 11 further including a thermostat disposed in said lower fluid chamber to monitor the temperature of liquid received through said fluid inlet said thermostat being isolated from said upper float chamber by said float seated on said gas outlet seat when said fluid flow control device is in said backflow restriction mode.

13. The fluid flow control device of claim 11 wherein the density of said float is such that said float will not float in liquid or gas within said upper float chamber.

14. The fluid flow control device of claim 13 wherein the weight of said float less the weight of displaced liquid within said chamber does not exceed the force due to pressure applied to dislodge said float from said fluid backflow seat.

* * * * *